US012621182B2

(12) United States Patent (10) Patent No.: US 12,621,182 B2
Piednoel et al. (45) Date of Patent: May 5, 2026

(54) FUNCTIONAL SAFETY FOR SYSTEM-ON-CHIP ARRANGEMENTS

(71) Applicant: Mercedes-Benz Group AG, Stuttgart (DE)

(72) Inventors: Francois Piednoel, Sunnyvale, CA (US); Oliver Pöllny, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 301 days.

(21) Appl. No.: 18/212,442

(22) Filed: Jun. 21, 2023

(65) Prior Publication Data

US 2024/0430125 A1 Dec. 26, 2024

(51) Int. Cl.
*H04L 12/40* (2006.01)
*B60W 60/00* (2020.01)
*G06F 11/10* (2006.01)

(52) U.S. Cl.
CPC ..... *H04L 12/40006* (2013.01); *B60W 60/001* (2020.02); *G06F 11/1044* (2013.01); *H04L 2012/40273* (2013.01)

(58) Field of Classification Search
CPC ........ H04L 12/40; H04L 41/40; B60W 60/00; B60W 50/06; B60W 50/04; B60W 50/02; B60W 50/00; G06F 11/10; G06F 11/16; G06F 11/30; G06F 11/07; G06F 11/20; G06F 15/16; G06F 15/78; G06F 12/08; G06F 9/38; G06F 9/50; G06F 9/48; G06F 9/46; G06F 9/52; G06F 9/44
USPC ......................................................... 370/252
See application file for complete search history.

(56) References Cited

U.S. PATENT DOCUMENTS

| | | | | |
|---|---|---|---|---|
| 10,992,257 | B2 | 4/2021 | Narla | |
| 11,144,027 | B2 * | 10/2021 | Capodanno | G06F 11/076 |
| 11,269,799 | B2 * | 3/2022 | O'Bleness | G06F 13/4027 |
| 11,360,846 | B2 * | 6/2022 | Boschi | G06F 11/201 |
| 11,388,054 | B2 | 7/2022 | Bernat | |
| 11,410,266 | B2 | 8/2022 | Matam | |
| 11,538,287 | B2 * | 12/2022 | Fang | G07C 5/0816 |
| 11,565,606 | B2 | 1/2023 | Kazuno | |
| 11,573,856 | B1 | 2/2023 | Ditty | |
| 11,636,063 | B2 * | 4/2023 | Hung | G06N 3/063 |
| | | | | 712/7 |

(Continued)

FOREIGN PATENT DOCUMENTS

| | | |
|---|---|---|
| CN | 110879546 A | 3/2020 |
| CN | 112149369 A | 12/2020 |

(Continued)

OTHER PUBLICATIONS

Francois Piednoel, SNUG Silicon Valley 2023 Keynote, The Standardization Imperative for Chiplets. Mar. 29-30, 2023, Santa Clara, CA. https://www.synopsys.com/community/resources/videos/snug-keynotes.html.

(Continued)

*Primary Examiner* — Man U Phan
(74) *Attorney, Agent, or Firm* — Mahamedi IP Law LLP

(57) ABSTRACT

A sensor data input chiplet obtains sensor data from a sensor system. A central chiplet executes a functional safety program to dynamically compare and verify output of workloads being executed by a set of workload processing chiplets, where the workloads are executed across the set of workload processing chiplets based on the sensor data.

18 Claims, 9 Drawing Sheets

(56) References Cited

U.S. PATENT DOCUMENTS

| | | | | |
|---|---|---|---|---|
| 12,136,002 | B1 * | 11/2024 | Piednoel | G06F 9/5027 |
| 12,199,838 | B2 * | 1/2025 | Binet | G06F 11/2007 |
| 12,229,079 | B2 * | 2/2025 | Piednoel | G06F 15/7825 |
| 12,276,963 | B2 * | 4/2025 | Raj | B25J 9/1674 |
| 2019/0391855 | A1 | 12/2019 | Bernat | |
| 2020/0017114 | A1 | 1/2020 | Santoni et al. | |
| 2021/0192867 | A1 | 6/2021 | Fang | |
| 2022/0114028 | A1 | 4/2022 | Peng et al. | |
| 2022/0283971 | A1 | 9/2022 | Lee | |
| 2023/0032305 | A1 | 2/2023 | Krishnani | |
| 2023/0036117 | A1 | 2/2023 | Krishnani | |
| 2023/0046642 | A1 | 2/2023 | Hung et al. | |
| 2023/0063601 | A1 | 3/2023 | Upadhyay | |
| 2023/0176577 | A1 * | 6/2023 | Ditty | G05D 1/0088 |
| | | | | 701/23 |
| 2023/0342161 | A1 * | 10/2023 | Binet | G06F 9/4405 |
| 2024/0375670 | A1 * | 11/2024 | Piednoel | G06F 15/7807 |
| 2024/0378090 | A1 * | 11/2024 | Piednoel | G06F 9/505 |
| 2024/0409106 | A1 | 12/2024 | Piednoel | |
| 2025/0042418 | A1 | 2/2025 | Piednoel | |

FOREIGN PATENT DOCUMENTS

| | | |
|---|---|---|
| CN | 114780227 A | 7/2022 |
| CN | 115688093 A | 2/2023 |
| GB | 2560708 | 9/2018 |
| KR | 20210015472 A | 2/2021 |

OTHER PUBLICATIONS

International Search Report with Written Opinion of the International Searching Authority for the Application No. PCT/EP2024/059468 mailed Jul. 18, 2024.

International Search Report and Written Opinion issued by the International Searching Authority on Nov. 15, 2025 for PCT Application No. PCT/EP2024/025229. 10 pages.

Abella, Jaume et al. "Envisioning a Safety Island to Enable HPC Devices in Safety-Critical Domains" Hardware and Architecture (cs.AR), Cornell University, submitted Jul. 21, 2023. 9 pages.

Ma, Yenai et al "Tap-2.5D: A Thermally-Aware Chiplet Placement Methodology for 2.5D Systems" ResearchGate, Conference Paper, Feb. 2021. 7 pages.

Avani, Dave, "A Survey of AI-Based Smart Chiplets and Interconnects for Vehicles", North American Journal of Engineering; Research, vol. 2, No. 4, Nov. 2021, Accessed: Nov. 20, 2025. [Online]. Available: https://najer.org/najer/article/view/64.

Guangbao, Shan et al. "Architecture of Computing System Based on Chiplet" Micromachines; Jan. 28, 2022; found online at: https://doi.org/10.3390/mi13020205.

* cited by examiner

Obtain Sensor Data From Sensor System
700

Execute Workloads Based On The Sensor Data
705

Execute FuSa Program To Dynamically Compare And Verify
Output Of Workloads
710

FUNCTIONAL SAFETY FOR SYSTEM-ON-CHIP ARRANGEMENTS

BACKGROUND

Universal Chiplet Interconnect Express (UCIe) provides an open specification for an interconnect and serial bus between chiplets, which enables the production of large system-on-chip (SoC) packages with intermixed components from different silicon manufacturers. Autonomous vehicle computing systems may operate using chiplet arrangements that follow the UCIe specification. One goal of creating such computing systems is to achieve the robust safety integrity levels of other important electrical and electronic (E/E) automotive components of the vehicle.

SUMMARY

A computing system can include a sensor data input chiplet to obtain sensor data from a sensor system of a vehicle, and one or more workload processing chiplets that execute workloads based on the sensor data. The computing system can further include a first central chiplet comprising a shared memory including a functional safety (FuSa) program that the first central chiplet to dynamically compare and verify output of workloads being executed by the set of workload processing chiplets. In various examples, the computing system can be included on a vehicle, and the workloads can comprise inference tasks based on the sensor data for autonomously operating the vehicle. In certain implementations, the workloads can be executed by the set of workload processing chiplets in independent pipelines, and the FuSa program can dynamically compare and verify output of the independent pipelines by executing a set of FuSa workloads in a FuSa pipeline.

In some embodiments, the computing system can comprise a first system-on-chip (SoC) that includes the first central chiplet and a second SoC that includes a second central chiplet. The first SoC and the second SoC can be communicatively coupled by an interconnect, and the FuSa program can also be included in the second central chiplet of the second SoC. In such embodiments, the FuSa program included in the second central chiplet of the second SoC causes the second SoC to monitor the shared memory of the first central chiplet of the first SoC to dynamically determine whether the first SoC is functioning within nominal operating parameters. In response to determining that the first SoC is not functioning within nominal operating parameters, the FuSa program of the second SoC can cause a second set of workload processing chiplets of the second SoC to take over execution of the workloads. As provided herein, the nominal operating parameters can correspond to nominal temperature ranges, voltage ranges, or any, faults, failures, or errors on the first SoC.

In various implementations, the sensor data input chiplet, the central chiplet, and the one or more workload processing chiplets can communicate over a performance network comprising a plurality of network hubs. The performance network can comprise a high-bandwidth network for the transmission of raw sensor data, processed sensor data, and messages. In further implementations, the FuSa program can monitor communications through the plurality of network hubs between the sensor data input chiplet, the central chiplet, and the one or more workload processing chiplets. For example, the FuSa program can monitor communications through the plurality of network hubs using a set of FuSa accounting hubs that communicate over a high-reliability FuSa network.

In certain examples, the central chiplet can comprise a dedicated FuSa CPU executing the FuSa program to communicate over the performance network via a performance network-on-chip (NoC), and communicate over the high-reliability FuSa network via a FuSa NoC. The one or more workload processing chiplets can transmit processed sensor data corresponding to the execution of workloads to a cache memory of the central chiplet over the performance network. The workload processing chiplets can further transmit a first error correction code (ECC) along the high-reliability FuSa network to the central chiplet based on the processed sensor data. Upon receiving the processed sensor data, the central chiplet can generate a second ECC using the processed sensor data. The FuSa CPU of the central chiplet may then perform a functional safety call in the central chiplet to verify that the first ECC and the second ECC match to ensure that the processed data was transmitted correctly.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
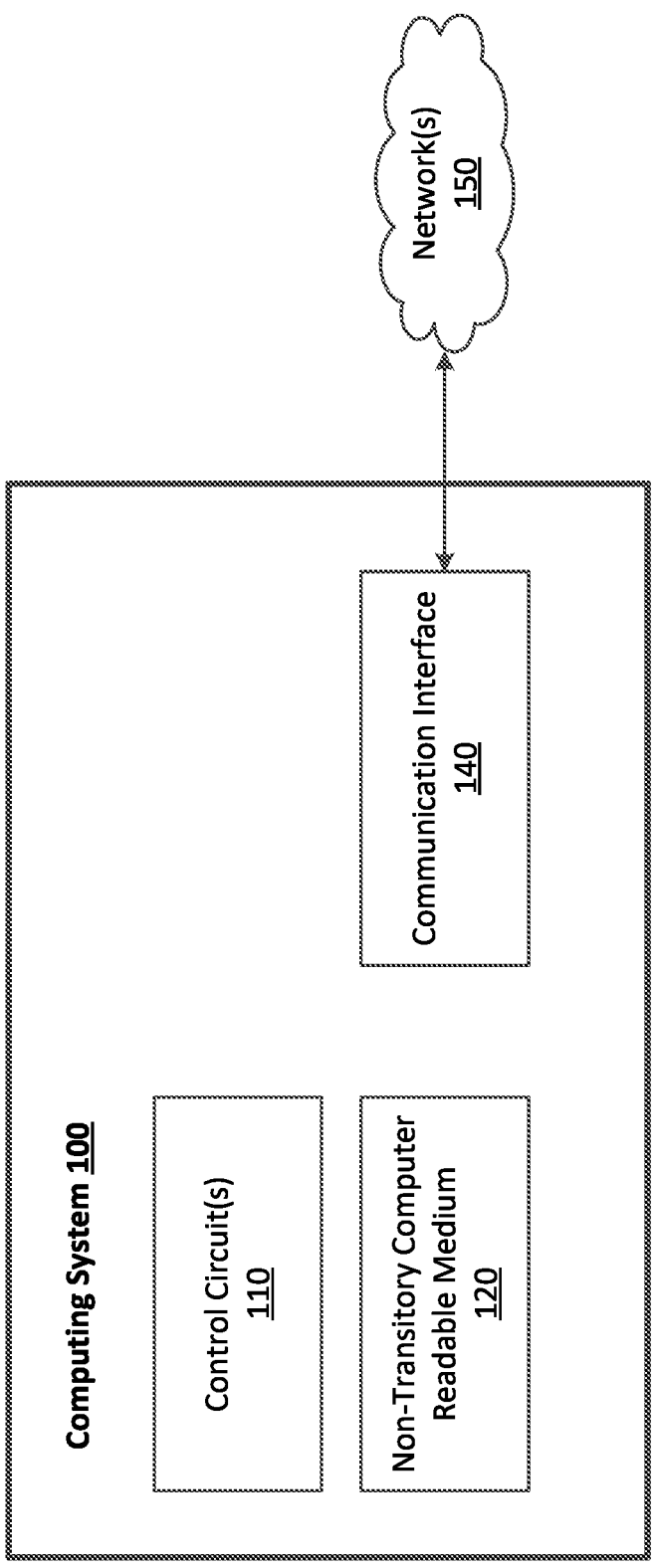
FIG. 1 is a block diagram depicting an example computing system in which embodiments described herein may be implemented, in accordance with examples described herein.

In experimentation and controlled testing environments, system redundancies and automotive safety integrity level (ASIL) ratings for autonomy systems are not typically a priority consideration. As autonomous driving features continue to advance (e.g., beyond Level 3 autonomy), and autonomous vehicles begin operating more commonly on public road networks, the qualification and certification of E/E components related to autonomous operation of the vehicle will be advantageous to ensure operational safety of these vehicles. Furthermore, novel methods for qualifying and certifying hardware, software, and/or hardware/software combinations will also be advantageous in increasing public confidence and assurance that autonomous driving systems are safe beyond current standards. For example, certain safety standards for autonomous driving systems include safety thresholds that correspond to average human abilities and care. Yet, these statistics include vehicle incidences involving impaired or distracted drivers and do not factor in specified time windows in which vehicle operations are inherently riskier (e.g., inclement weather conditions, late night driving, winding mountain roads, etc.).

Automotive safety integrity level (ASIL) is a risk classification scheme defined by ISO 26262 (the functional safety for road vehicles standard), and is typically established for the E/E components of the vehicle by performing a risk analysis of potential hazards, which involves determining respective levels of severity (i.e., the severity of injuries the hazard can be expected to cause; classified between S0 (no injuries) and S3 (life-threatening injuries)), exposure (i.e., the relative expected frequency of the operational conditions in which the injury can occur; classified between E0 (incredibly unlikely) and E4 (high probability of injury under most operating conditions)), and controllability (i.e., the relative likelihood that the driver can act to prevent the injury; classified between C0 (controllable in general) and C3 difficult to control or uncontrollable)) of the vehicle operating scenario. As such, the safety goal(s) for any potential hazard event includes a set of ASIL requirements.

Hazards that are identified as quality management (QM) do not dictate any safety requirements. As an illustration, these QM hazards may be any combination of low probability of exposure to the hazard, low level of severity of potential injuries resulting from the hazard, and a high level of controllability by the driver in avoiding the hazard and/or preventing injuries. Other hazard events are classified as ASIL-A, ASIL-B, ASIL-C, or ASIL-D depending on the various levels of severity, exposure, and controllability corresponding to the potential hazard. ASIL-D events correspond to the highest integrity requirements (ASIL requirements) on the safety system or E/E components of the safety system, and ASIL-A comprises the lowest integrity requirements. As an example, the airbags, anti-lock brakes, and power steering system of a vehicle will typically have an ASIL-D grade, where the risks associated with the failure of these components (e.g., the probable severity of injury and lack of vehicle controllability to prevent those injuries) are relatively high.

As provided herein, the ASIL may refer to both risk and risk-dependent requirements, where the various combinations of severity, exposure, and controllability are quantified to form an expression of risk (e.g., an airbag system of a vehicle may have a relatively low exposure classification, but high values for severity and controllability). As provided above, the quantities for severity, exposure, and controllability for a given hazard are traditionally determined using values for severity (e.g., S0 through S3), exposure (e.g., E0 through E4), and controllability (e.g., C0 through C3) in the ISO 26262 series, where these values are then utilized to classify the ASIL requirements for the components of a particular safety system. As provided herein, certain safety systems can perform variable mitigation measures, which can range from alerts (e.g., visual, auditory, or haptic alerts), minor interventions (e.g., brake assist or steer assist), major interventions and/or avoidance maneuvering (e.g., taking over control of one or more control mechanisms, such as the steering, acceleration, or braking systems), and full autonomous control of the vehicle.

Current fully autonomous driving systems can comprise non-deterministic inference models, in which the system executes one or more perception, object detection, object classification, motion prediction, motion planning, and vehicle control techniques based on, for example, two-dimensional image data, to perform all autonomous driving tasks. It is contemplated that such implementations may be difficult or impossible to certify and provide an ASIL rating for the overall autonomous driving system. To address these shortcomings in current implementations, an autonomous driving system is provided herein that may perform deterministic, reflexive inference operations on specified hardware arrangements that allow for the certification and ASIL grading of various components, software aspects of the system, and/or the entire autonomous driving system itself.

Example computing systems are described herein which comprise MSoC arrangements comprising a primary SoC and backup SoC, with each SoC executing a FuSa program to monitor a shared memory of the other SoC, compare and verify independent pipeline outputs based on workload processing chiplets executing workloads, and generate error correction codes for communications between the sensor data input chiplet, central chiplet, and/or the workload processing chiplets. In certain embodiments, the FuSa program can be executed by a dedicated FuSa CPU in the central chiplet to perform these tasks. In the context of autonomous driving, the FuSa program can facilitate redundancy between the primary and backup SoCs, perform verification of inference tasks performed by the central chiplet and/or workload processing chiplets, and reduce errors in communications between the chiplets using one or more error correction code techniques. Such FuSa tasks can contribute to an enhanced ASIL rating of various components of an autonomous drive system, as well as the autonomous drive system of the vehicle itself. For example, it is contemplated that the FuSa tasks and robust hardware components described herein can result in an ASIL-D rating for the autonomous drive system.

In certain implementations, the example computing systems can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer programs, or a computer usable carrier medium capable of carrying such a program.

Example Computing System

FIG. 1 is a block diagram depicting an example computing system 100 in which embodiments described herein may be implemented, in accordance with examples described herein. In an embodiment, the computing system 100 can include one or more control circuits 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit(s) 110 and/or computing system 100 may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" is used herein interchangeably with "and/or").

In an embodiment, the control circuit(s) 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, for example, a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions, such as instructions to perform the below methods described in connection with FIGS. 7-9.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when the control circuit(s) 110 or other hardware components execute the modules or computer-readable instructions.

In further embodiments, the computing system 100 can include a communication interface 140 that enables communications over one or more networks 150 to transmit and receive data. In various examples, the computing system 100 can communicate, over the one or more networks 150, with fleet vehicles using the communication interface 140 to receive sensor data and implement the methods described throughout the present disclosure. In certain embodiments, the communication interface 140 may be used to communicate with one or more other systems. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the control circuit(s) 110 of the computing system 100 can include a SoC arrangement that facilitates the various methods and techniques described throughout the present disclosure. In various examples, the SoC can include a set of chiplets, including a central chiplet comprising a shared memory in which a reservation table is utilized to execute various autonomous driving workloads in independent deterministic pipelines. According to embodiments described herein, the shared memory of the central chiplet can include a FuSa program executable by the control circuit 110 to perform functional safety tasks for the SoC arrangement, as described in detail below.

Example System-on-Chip

Figure 2:
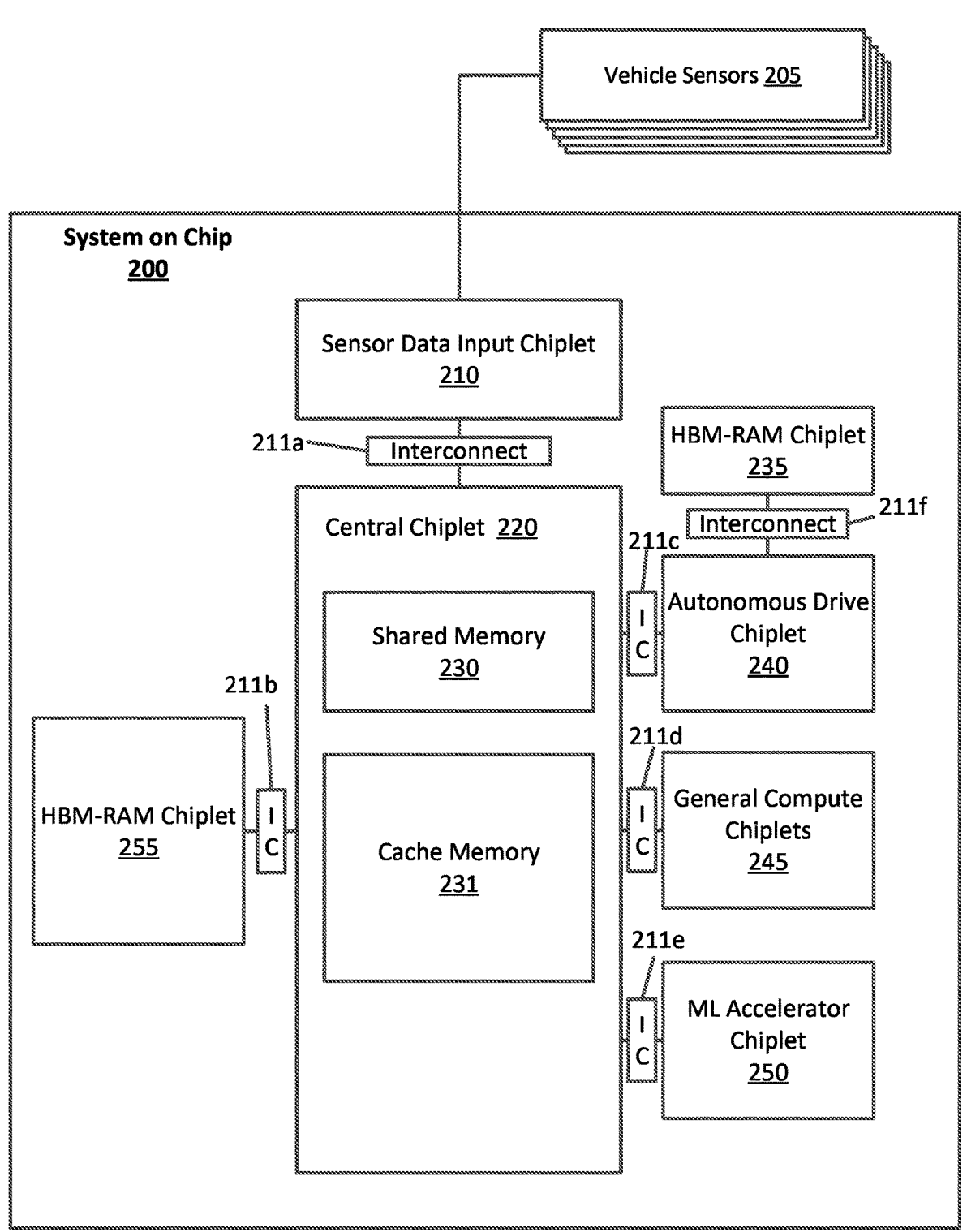
FIG. 2 is a block diagram depicting a system-on-chip (SoC) in which examples described herein may be implemented, in accordance with examples described herein.

FIG. 2 is a block diagram illustrating an example SoC 200, in accordance with examples described herein. The example SoC 200 shown in FIG. 2 can include additional components, and the components of system on chip 200 may be arranged in various alternative configurations other than the example shown. Thus, the system on chip 200 of FIG. 2 is described herein as an example arrangement for illustrative purposes and is not intended to limit the scope of the present disclosure in any manner.

Referring to FIG. 2, a sensor data input chiplet 210 of the system on chip 200 can receive sensor data from various vehicle sensors 205 of the vehicle. These vehicle sensors 205 can include any combination of image sensors (e.g., single cameras, binocular cameras, fisheye lens cameras, etc.), LIDAR sensors, radar sensors, ultrasonic sensors, proximity sensors, and the like. The sensor data input chiplet 210 can automatically dump the received sensor data as it's received into a cache memory 231 of the central chiplet 220. The sensor data input chiplet 210 can also include an image signal processor (ISP) responsible for capturing, processing, and enhancing images taken from the various vehicle sensors 205. The ISP takes the raw image data and performs a series of complex image processing operations, such as color, contrast, and brightness correction, noise reduction, and image enhancement, to create a higher-quality image that is ready for further processing or analysis by the other chiplets of the SoC 200. The ISP may also include features such as auto-focus, image stabilization, and advanced scene recognition to further enhance the quality of the captured images. The ISP can then store the higher-quality images in the cache memory 231.

In some aspects, the sensor data input chiplet 210 publishes identifying information for each item of sensor data (e.g., images, point cloud maps, etc.) to a shared memory 230 of a central chiplet 220, which acts as a central mailbox for synchronizing workloads for the various chiplets. The identifying information can include details such as an address in the cache memory 231 where the data is stored, the type of sensor data, which sensor captured the data, and a timestamp of when the data was captured.

To communicate with the central chiplet 220, the sensor data input chiplet 210 transmits data through an interconnect 211a. Interconnects 211a-f each represent die-to-die (D2D) interfaces between the chiplets of the SoC 200. In some aspects, the interconnects include a high-bandwidth data path used for general data purposes to the cache memory 231 and a high-reliability data path to transmit functional safety and scheduler information to the shared memory 230. Depending on bandwidth requirements, an interconnect may include more than one die-to-die interface. For example, interconnect 211a can include two interfaces to support higher bandwidth communications between the sensor data input chiplet 210 and the central chiplet 220.

In one aspect, the interconnects 211a-f implement the Universal Chiplet Interconnect Express (UCIe) standard and communicate through an indirect mode to allow each of the chiplet host processors to access remote memory as if it were local memory. This is achieved by using a specialized Network on Chip (NoC) Network Interface Unit (NIU) (allows freedom of interferences between devices connected to the network) that provides hardware-level support for remote direct memory access (RDMA) operations. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the system on chip 200 can include additional chiplets that can store, alter, or otherwise process the sensor data cached by the sensor data input chiplet 210. The system on chip 200 can include an autonomous drive chiplet 240 that can perform the perception, sensor fusion, trajectory prediction, and/or other autonomous driving algorithms of the autonomous vehicle. The autonomous drive chiplet 240 can be connected to a dedicated HBM-RAM chiplet 235 in which the autonomous drive chiplet 240 can publish all status information, variables, statistical information, and/or processed sensor data as processed by the autonomous drive chiplet 240.

In various examples, the system on chip 200 can further include a machine-learning (ML) accelerator chiplet 250 that is specialized for accelerating AI workloads, such as image inferences or other sensor inferences using machine learning, in order to achieve high performance and low power consumption for these workloads. The ML accelerator chiplet 250 can include an engine designed to efficiently process graph-based data structures, which are commonly used in AI workloads, and a highly parallel processor, allowing for efficient processing of large volumes of data. The ML accelerator chiplet 250 can also include specialized hardware accelerators for common AI operations such as matrix multiplication and convolution as well as a memory hierarchy designed to optimize memory access for AI workloads, which often have complex memory access patterns.

The general compute chiplets 245 can provide general purpose computing for the system on chip 200. For example, the general compute chiplets 245 can comprise high-powered central processing units and/or graphical processing units that can support the computing tasks of the central chiplet 220, autonomous drive chiplet 240, and/or the ML accelerator chiplet 250.

In various implementations, the shared memory 230 can store programs and instructions for performing autonomous driving tasks. The shared memory 230 of the central chiplet 220 can further include a reservation table that provides the various chiplets with the information needed (e.g., sensor data items and their locations in memory) for performing their individual tasks. Further description of the shared memory 230 in the context of the dual SoC arrangements described herein is provided below with respect to FIG. 4. The central chiplet 220 also includes the large cache memory 231, which supports invalidate and flush operations for stored data.

Cache miss and evictions from the cache memory 231 are sent by a high-bandwidth memory (HBM) RAM chiplet 255 connected to the central chiplet 220. The HBM-RAM chiplet 255 can include status information, variables, statistical information, and/or sensor data for all other chiplets. In certain examples, the information stored in the HBM-RAM chiplet 255 can be stored for a predetermined period of time (e.g., ten seconds) before deleting or otherwise flushing the data. For example, when a fault occurs on the autonomous vehicle, the information stored in the HBM-RAM chiplet 255 can include all information necessary to diagnose and resolve the fault. Cache memory 231 keeps fresh data available with low latency and less power required compared to accessing data from the HBM-RAM chiplet 255.

As provided herein, the shared memory 230 can house a mailbox architecture in which a reflex program comprising a suite of instructions is used to execute workloads by the central chiplet 220, general compute chiplets 245, and/or autonomous drive chiplet 240. In certain examples, the central chiplet 220 can further execute a functional safety (FuSa) program that operates to compare and verify outputs of respective pipelines to ensure consistency in the ML inference operations. In still further examples, the central chiplet 220 can execute a thermal management program to ensure that the various components of the SoC 200 operates within normal temperature ranges. Further description of the shared memory 230 in the context of out-of-order workload execution in independent deterministic pipelines is provided below with respect to FIG. 3.

Example Central Chiplet

Figure 3:
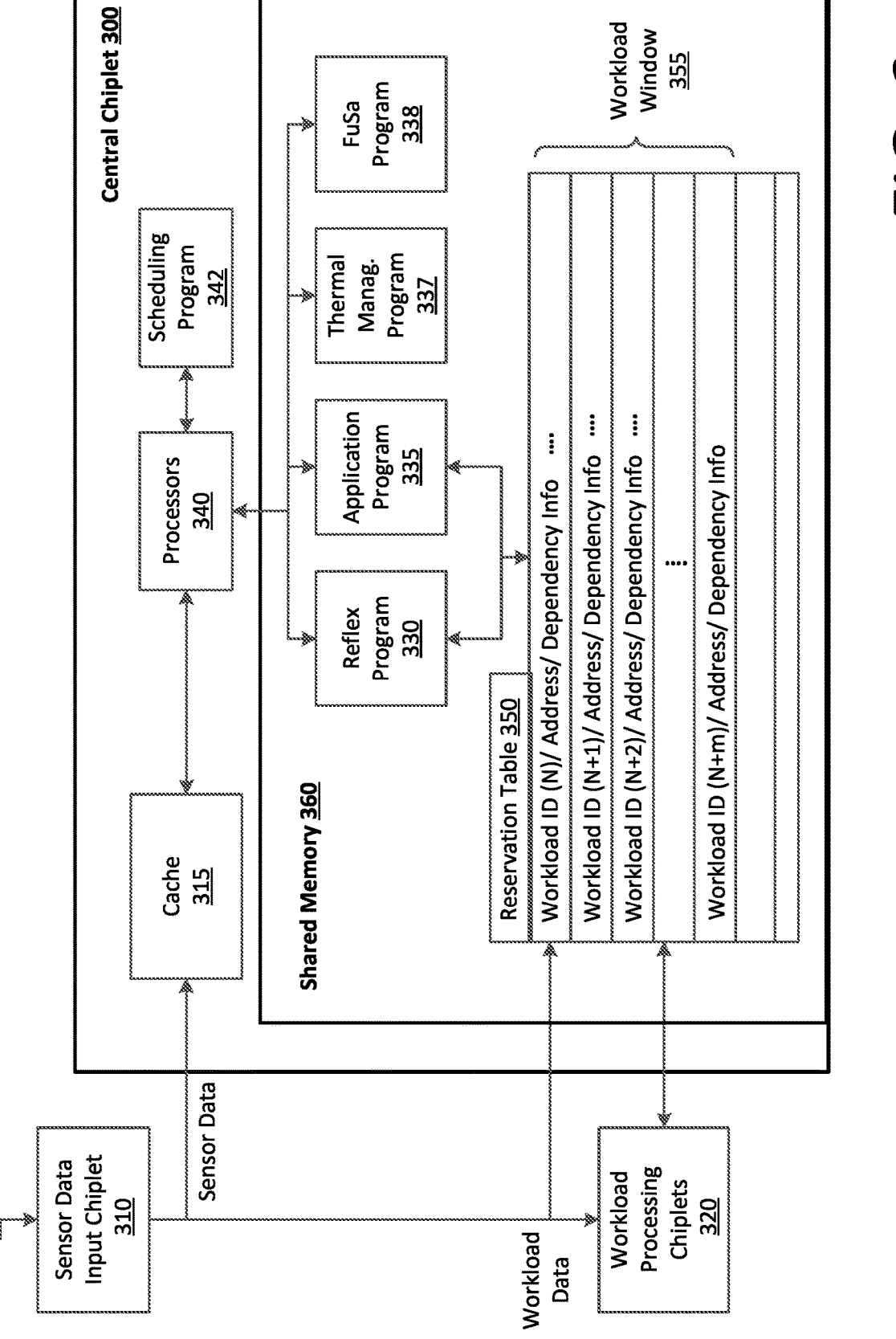
FIG. 3 is a block diagram illustrating an example central chiplet of an SoC arrangement for executing workloads, in accordance with examples described herein.

FIG. 3 is a block diagram illustrating an example central chiplet 300 of an SoC arrangement, in accordance with examples described herein. The central chiplet 300 shown in FIG. 3 can correspond to the central chiplet 220 of the SoC 200 as shown in FIG. 2. Furthermore, the sensor data input chiplet 310 of FIG. 3 can correspond to the sensor data input chiplet 210 shown in FIG. 2, and the workload processing chiplets 320 shown in FIG. 3, can correspond to any one or more of the general compute chiplets 245, ML accelerator chiplet 250, and/or the autonomous drive chiplet 240 shown in FIG. 2.

Referring to FIG. 3, the central chiplet 300 can include a shared memory 360 that includes a reflex program 330, an application program 335, a thermal management program 337, and a FuSa program 338. As provided herein, the reflex program 330 can comprise a set of instructions for executing reflex workloads in independent pipelines. The reflex workloads can comprise sensor data acquisition, sensor fusion, and inference tasks that facilitate scene understanding of the surrounding environment of the vehicle. These tasks can comprise two-dimensional image processing, sensor fused data processing (e.g., three-dimensional LIDAR, radar, and image fusion data), neural radiance field (NeRF) scene reconstruction, occupancy grid determination, object detection and classification, motion prediction, and other scene understanding tasks for autonomous vehicle operation.

As further provided herein, the application program 335 can comprise a set of instructions for operating the vehicle controls of the autonomous vehicle based on the outputs of the reflex workload pipelines. For example, the application program 335 can be executed by one or more processors 340 of the central chiplet 300 and/or one or more of the workload processing chiplets 320 (e.g., the autonomous drive chiplet 240 of FIG. 2) to dynamically generate a motion plan for the vehicle based on the execution of the reflex workloads, and operate the vehicle's controls (e.g., acceleration, braking, steering, and signaling systems) to execute the motion plan accordingly.

The thermal management program 337 can be executed by one or more processors 340 of the central chiplet to manage heat generated by the SoC. In various examples, the thermal management program 337 can operate a set of cooling components (e.g., heat sinks, fans, cold plates, heat pipes, synthetic jets, etc.) included with the SoC to manage local temperatures of computational components within normal operating ranges. In further examples, the thermal management program 337 can be executed by a dedicated CPU of the central chiplet 300 and can communicate with the workload processing chiplets 320 and sensor data input chiplet 310 for adjusting clocking or throttling the computing components to further manage temperatures. In certain implementations, the thermal management program 337 can execute on each SoC of a dual or multiple-SoC arrangement, and can further communicate with the FuSa program 338 to, for example, power down a primary SoC when temperatures exceed nominal ranges and enable a backup SoC to take over autonomous inference and driving tasks.

According to examples described herein, the FuSa program 338 can be executed by the one or more processors 340 (e.g., a dedicated FuSa CPU) of the central chiplet 300 to perform functional safety tasks for the SoC. As described throughout the present disclosure, these tasks can comprise acquiring and comparing output from multiple independent pipelines that correspond to inference and/or autonomous vehicle control tasks. For example, one independent pipeline can comprise workloads corresponding to identifying other vehicles operating around the vehicle in image data, and a second independent pipeline can comprise workloads corresponding to identifying other vehicles operating around the vehicle in radar and LIDAR data. The FuSa program 338 can execute FuSa workloads in another independent pipeline that acquires the output of the first and second independent pipelines to dynamically verify that they have identified the same vehicles.

In further examples, the FuSa program 338 can operate to perform SoC monitoring in a dual SoC arrangement in which a primary Soc performs the inference and vehicle control tasks, and a backup SoC performs health monitoring on the primary SoC with its chiplets in a low power standby mode, ready to take over these tasks if any errors, faults, or failures are detected in the primary SoC. Further description of these FuSa functions are described below with respect to FIG. 5. In still further examples, the FuSa program 338 can operate to monitor communications between chiplets and provide redundancy (e.g., via error correction code techniques) to ensure communication reliability between the chiplets. Further description of these techniques is provided below with respect to FIG. 6.

In various implementations, the central chiplet 300 can include a set of one or more processors 340 (e.g., a transient-resistant CPU and general compute CPUs) that can execute a scheduling program 342 for out-of-order execution of workloads in a set of deterministic pipelines. In certain examples, one or more of the processors 340 can execute reflex workloads in accordance with the reflex program 330 and/or application workloads in accordance with the application program 335. As such, the processors 340 of the central chiplet 300 can reference, monitor, and update dependency information in workload entries of the reservation table 350 as workloads become available and are executed accordingly. For example, when a workload is executed by a particular chiplet, the chiplet updates the dependency information of other workloads in the reservation table 350 to indicate that the workload has been completed. This can include changing a bitwise operator or binary value representing the workload (e.g., from 0 to 1) to indicate in the reservation table 350 that the workload has been completed. Accordingly, the dependency information for all workloads having dependency on the completed workload is updated accordingly.

According to examples described herein, the reservation table 350 can include workload entries, each of which indicates a workload identifier that describes the workload to be performed, an address in the cache memory 315 and/or HBM-RAM of the location of raw or processed sensor data required for executing the workload, and any dependency information corresponding to dependencies that need to be resolved prior to executing the workload. In certain aspects, the dependencies can correspond to other workloads that need to be executed. Once the dependencies for a particular workload are resolved, the workload entry can be updated (e.g., by the chiplet executing the dependent workloads, or by the processors 340 of the central chiplet 300 through execution of the scheduling program 342). When no dependencies exist for a particular workload as referenced in the reservation table 350, the workload can be executed in a respective pipeline by a corresponding workload processing chiplet 320.

In various implementations, the sensor data input chiplet 310 obtains sensor data from the sensor system of the vehicle, and stores the sensor data (e.g., image data, LIDAR data, radar data, ultrasonic data, etc.) in a cache 315 of the central chiplet 300. The sensor data input chiplet 310 can generate workload entries for the reservation table 350 comprising identifiers for the sensor data (e.g., an identifier for each obtained image from various cameras of the vehicle's sensor system) and provide an address of the sensor data in the cache memory 315. An initial set of workloads be executed on the raw sensor data by the processors 340 of the central chiplet 300 and/or workload processing chiplets 320, which can update the reservation table 350 to indicate that the initial set of workloads have been completed.

As described herein, the workload processing chiplets 320 monitor the reservation table 350 to determine whether particular workloads in their respective pipelines are ready for execution. As an example, the workload processing chiplets 320 can continuously monitor the reservation table using a workload window 355 (e.g., an instruction window for multimedia data) in which a pointer can sequentially read through each workload entry to determine whether the workloads have any unresolved dependencies. If one or more dependencies still exist in the workload entry, the pointer progresses to the next entry without the workload being executed. However, if the workload indicates that all dependencies have been resolved (e.g., all workloads upon which the particular workload depends have been executed), then the relevant workload processing chiplet 320 and/or processors 340 of the central chiplet 300 can execute the workload accordingly.

As such, the workloads are executed in an out-of-order manner where certain workloads are buffered until their dependencies are resolved. Accordingly, to facilitate out-of-order execution of workloads, the reservation table 350 comprises an out-of-order buffer that enables the workload processing chiplets 320 to execute the workloads in an order governed by the resolution of their dependencies in a deterministic manner. It is contemplated that out-of-order execution of workloads in the manner described herein can increase speed, increase power efficiency, and decrease complexity in the overall execution of the workloads.

As described herein, the workload processing chiplets 320 can execute workloads in each pipeline in a deterministic manner, such that successive workloads of the pipeline are dependent on the outputs of preceding workloads in the pipeline. In various implementations, the processors 340 and workload processing chiplets 320 can execute multiple independent workload pipelines in parallel, with each workload pipeline including a plurality of workloads to be executed in a deterministic manner. Each workload pipeline can provide sequential outputs (e.g., for other workload pipelines or for processing by the application program 335 for autonomously operating the vehicle). Through concurrent execution of the reflex workloads in deterministic pipelines, the application program 335 can autonomously operate the controls of the vehicle along a travel route.

As an illustration, the scheduling program 342 can cause the processors 340 and workload processing chiplets 320 to perform out-of-order execution on the workloads in independent pipelines. In previous implementations, each image generated by the camera system of the vehicle would be processed or inferred on as the image becomes available. The instruction set would involve acquiring the image, scheduling inference on the image by a workload processing chiplet, performing inference on the image, acquiring a second image, scheduling inference on the second image by the workload processing chiplet, and performing inference on the second image, and so on across the suite of cameras of the vehicle. By reorganizing the order in which workloads are processed, the complexity of computation is significantly reduced. Specifically, for validating an autonomous driving system that utilizes out-of-order workload execution as described herein, the number of computational combinations for verification (e.g., by a safety authority) is significantly reduced.

As provided herein, the use of the workload window 355 and reservation table 350 referencing dependency information for workloads enables the workload processing chiplets 320 to operate more efficiently by performing out-of-order execution on the workloads. Instead of performing inference on images based on when they are available, a workload processing chiplet 320 can acquire all images from all cameras first, and then perform inference on all the images together. Accordingly, the workload processing chiplet 320 executes its workloads with significantly reduced complexity, increased speed, and reduced power requirements.

In further examples, the shared memory 360 can include a thermal management program 337 executable by the one or more processors 340 to manage the various temperatures of the SoC 200, operate cooling components, perform hardware throttling, switch to backup components (e.g., a backup SoC), and the like. In still further examples, the shared memory 360 can include a FuSa program 338 that performs functional safety tasks for the SoC 200, such as monitoring communications within the SoC (e.g., using error correction code), comparing outputs of different pipelines, and monitoring hardware performance of the SoC. According to examples described herein, the thermal management program 337 and FuSa program 338 can perform their respective tasks in independent pipelines.

Independent Deterministic Pipelines

Figure 4:
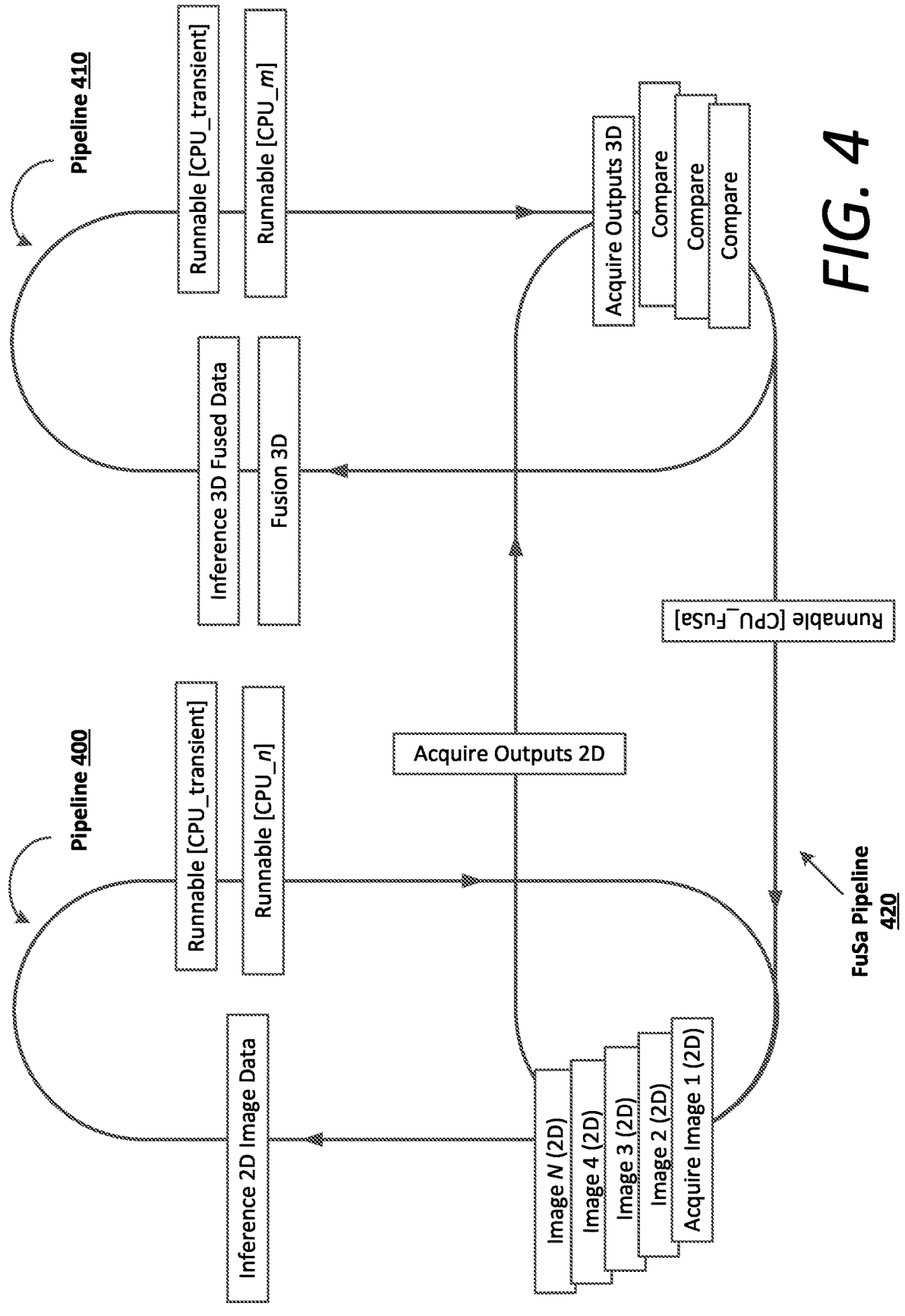
FIG. 4 depicts workloads being executed in a set of independent pipelines, and further depicts a functional safety (FuSa) pipeline operable to compare and verify the outputs of the independent pipelines, according to examples described herein.

FIG. 4 depicts workloads being executed in a set of independent pipelines 400, 410, and further depicts a functional safety (FuSa) pipeline 420 operable to compare and verify the outputs of independent pipelines, according to examples described herein. In the below discussion of FIG. 4, various workloads can be executed in independent deterministic pipelines by one or more processors 340 of the central chiplet 300 and/or the workload processing chiplets 320 through execution of the reflex program 330, application program 335, thermal program 337, FuSa program 338, and/or scheduling program 342 as depicted in FIG. 3.

Referring to FIG. 4, pipeline 400 and pipeline 410 are executed in parallel by one or more chiplets of the SoC. While only workload pipelines 400 and 410 are shown in FIG. 4, any number of pipelines can be executed in parallel by the central chiplet 300 and/or workload processing chiplets 320 in performing the reflex and application tasks described throughout the present disclosure. As described herein, the reflex and application tasks can comprise sensor data acquisition, sensor fusion, inference tasks that facilitate scene understanding of the surrounding environment of the vehicle, motion prediction, motion planning, and vehicle control tasks for autonomously operating a vehicle. Additional tasks may also be executed in individual pipelines, such as power control tasks, thermal management tasks, health monitoring tasks, and the like.

In various implementations, the scheduling program 342 can cause the workloads represented by the workload entries in the reservation table 350 to be executed deterministically in independent pipelines, such that the order of workload execution in each pipeline is consistent and non-reversible. Furthermore, the workloads executed in each pipeline can comprise a chain of dependency, such that the outputs of the pipelines are based on the same or similar workloads being sequentially executed in each pipeline. As such, complexity in the inference operations is significantly reduced, which can facilitate certification of each individual pipeline for autonomous driving purposes.

As an example, pipeline 400 can be tasked with performing inference on two-dimensional image data (e.g., to identify and classify other dynamic entities proximate to the vehicle in the images). A first workload in pipeline 400 can comprise obtaining images captured by each camera of the vehicle at a given time. A second workload in pipeline 400 can comprise stitching the images to form a 360-degree ribbon of the surrounding environment of the vehicle. A third workload in pipeline 400 can comprise performing inference on the two-dimensional image data (e.g., pixel analysis to identify the dynamic entities). Accordingly, an output of pipeline 400 can comprise a two-dimensional ribbon with dynamic entities identified (e.g., with a bounding box) and/or classified (e.g., as bicyclists, other vehicles, pedestrians, etc.).

As another example, pipeline 410 can be tasked with performing inference on three-dimensional sensor fusion data (e.g., comprising fused LIDAR, image, and/or radar data). For example, pipeline 410 can also be tasked with identifying external dynamic entities in the three-dimensional data. A first workload in pipeline 410 can comprise acquiring point clouds generated by LIDAR sensors of the vehicle at a given time, and acquiring radar and ultrasonic data from the same time. A second workload in pipeline 410 can comprise fusing the sensor data to provide a three-dimensional, fused sensor view of the surrounding environment of the vehicle. A third workload in pipeline 410 can comprise performing inference on the three-dimensional sensor fusion data to identify and/or classify the external dynamic entities.

As described herein, the workload processing chiplets (e.g., workload processing chiplets 320 and the central chiplet 300 of FIG. 3) can execute respective workloads in various other deterministic pipelines (e.g., in accordance with the reflex program 330 and/or application program 335 shown in FIG. 3). For example, a first pipeline can be dedicated for identifying traffic signals in two-dimensional image data, a second pipeline can be dedicated for identifying traffic signals in three-dimensional sensor fusion data, a third pipeline can be dedicated for identifying and classifying lane markings, a fourth pipeline can be dedicated for generating occupancy grid maps from the sensor data, a fifth pipeline can be dedicated for predicting the motion of external dynamic entities, a sixth pipeline can be dedicated for planning the motion of the vehicle based on the inferences from other pipelines, a seventh pipeline can be dedicated for controlling the vehicle's control systems to execute the motion plan generated by the sixth pipeline, and so on.

According to various examples, the workloads or tasks performed in each pipeline are ordered deterministically (e.g., by the scheduling program 342 of FIG. 3), which can significantly reduce complexity in certifying the autonomous drive system. For example, a single inference mechanism for an autonomous drive system that performs natural order processing using image data may not be certifiable due to the complexity and randomness of its workload executions, as well as the potential for outliers in the single inference mechanism (e.g., confusion about certain detected objects and lack of comparison between multiple inference mechanisms). These outliers may result in stuck states or collisions for the autonomous vehicle. With the use of deterministic pipelines that independently execute workloads, any outliers from one pipeline can be mitigated or otherwise overcome by comparison and confirmation mechanisms from other pipelines.

As shown in FIG. 4, the various workloads of pipeline 400 and pipeline 410 can be executed as runnables on one or more processers of one or more chiplets of the SoC 200. In certain examples, a transient-resistant CPU (e.g., of central chiplet 220 and/or general compute chiplets 245) can execute the workloads in pipeline 400 and pipeline 410. It is contemplated that the use of robust, transient-resistant CPUs (e.g., ASIL-D rated CPUs) for executing workloads in the independent deterministic pipelines can further bolster the ASIL rating of the autonomous drive system as a whole. These transient-resistant CPUs can be manufactured for robustness in terms of reliability, resistance to heat, cold, radiation, wear, age, vibration, shock, etc. It is further contemplated that transient-resistant CPUs may not have the computing power of modern, non-transient-resistant CPUs (e.g., having an ASIL-B rating) that are designed and manufactured to maximize bandwidth and processing speed.

As further shown in FIG. 4, the workloads in pipeline 400 and pipeline 410 can be executed as runnables on multiple CPUs of the SoC 200 and/or multiple chiplets of the SoC 200. For example, a transient-resistant CPU can execute workloads in each pipeline 400, 410 and can be backed up by one or more state-of-the art CPUs that execute the same workloads in each pipeline 400, 410. The transient-resistant CPU(s) may execute workloads in each pipeline 400, 410 at a lower frequency than the other CPUs. For example, the transient-resistant CPU(s) can execute the workloads in each pipeline 400, 410 and provide outputs on the order of microseconds, whereas the other CPUs can provide outputs for each pipeline 400, 410 on the order of nanoseconds.

In an example, the transient-resistant CPUs may execute workloads in deterministic pipeline 400 and identify external dynamic objects (e.g., other vehicles, bicyclists, pedestrians, etc.) in two-dimensional image data every few microseconds. The other CPU may execute the same workloads in deterministic pipeline 400 to identify the same external dynamic entities every few nanoseconds (e.g., or at the same frequency that the images are generated by the cameras). Thus, the outputs by the transient-resistant CPU(s) can be verified or confirmed by the outputs of the other CPU(s) in each deterministic pipeline. This process can occur for each independent pipeline performing inference operations (e.g., the reflex program 330), and can further be utilized for the application program 335, thermal management program 337, and/or the FuSa program 338.

In certain aspects, the workloads of pipeline 400 and pipeline 410 can be executed by one or more CPUs of the central chiplet 220 and/or one or more CPUs of the general compute chiplets 245. FIG. 4 further shows an example FuSa pipeline 420 that dynamically compares and verifies the outputs of the runnables for each pipeline 400, 410, according to various examples. In certain implementations, the FuSa pipeline 420 can compare the outputs of multiple runnables performed by different CPUs in each pipeline 400, 410, as well as comparing the outputs of pipeline 400 with the outputs of pipeline 410. In the example of identifying and classifying dynamic external entities, the two-dimensional outputs from pipeline 400 can indicate the entities in image data that lacks precise distance information to each entity, whereas the three-dimensional outputs from pipeline 410 may lack information such as color and edge detail that facilitates classification of the external entities. Furthermore, the sensor fused data processed in pipeline 410 can include radar and/or ultrasonic data that can provide detailed proximity and or speed differential information of the external entities.

As such, the outputs of pipeline 400 and pipeline 410 have different outliers that, when viewed alone, can affect the accuracy the autonomous drive system's capabilities. As described herein, the various workload processing chiplets (e.g., chiplets 320 and central chiplet 300 of FIG. 3) can execute workloads in any number of pipelines, with each pipeline having different outliers based on the sensor data being processed. As further described herein, the outputs of certain pipelines can be compared with the outputs of other pipelines through the execution of one or more FuSa pipelines 420 that acquire and dynamically verify the respective outputs of different independent pipelines.

As shown in FIG. 4, the FuSa pipeline 420 can acquire the outputs of pipeline 400 and pipeline 410 and compare and verify their outputs. As described herein, the outputs can correspond to any inference operations relating to the processing of sensor data from the sensor system of the vehicle. In various examples, the runnable of the FuSa pipeline 420 can be executed on a dedicated CPU (e.g., on the central chiplet 220 of the SoC 200 arrangement).

In the example shown in FIG. 4, the FuSa pipeline 420 acquires the two-dimensional outputs of pipeline 400 and the three-dimensional outputs of pipeline 410. The FuSa pipeline 420 then compares the two-dimensional and three-dimensional outputs to determine whether they are consistent with each other. For inferences involving the identification and/or classification of external dynamic entities, the FuSa pipeline 420 will confirm whether pipeline 400 and pipeline 410 have both separately identified and/or classified the same external dynamic entities in the surrounding environment of the vehicle using different sensor data and/or techniques having different outliers.

While the examples shown in FIG. 4 show pipelines involving different types of sensor data, numerous other deterministic pipelines are contemplated in which a FuSa pipeline is utilized to compare and dynamically verify their outputs. For example, this can include a FuSa pipeline that compares outputs of multiple pipelines tasked to identify traffic signals and traffic signal states, outputs of motion prediction pipelines tasked to predict the motion of external dynamic entities, and comparable outputs of other deterministic pipelines that facilitate in autonomously operating the vehicle. As such, any issue that occurs in any pipeline can be readily detected and flagged by a FuSa pipeline. It is contemplated that the use of transient-resistant CPUs with support from general compute CPUs, the execution of workloads in verifiable deterministic pipelines, and the use of FuSa pipelines to dynamically compare and verify the outputs from the deterministic pipelines, can all combine to provide an increased ASIL rating (e.g., an ASIL-D rating) for the autonomous driving system of the vehicle.

Multiple-System-on-Chip

Figure 5:
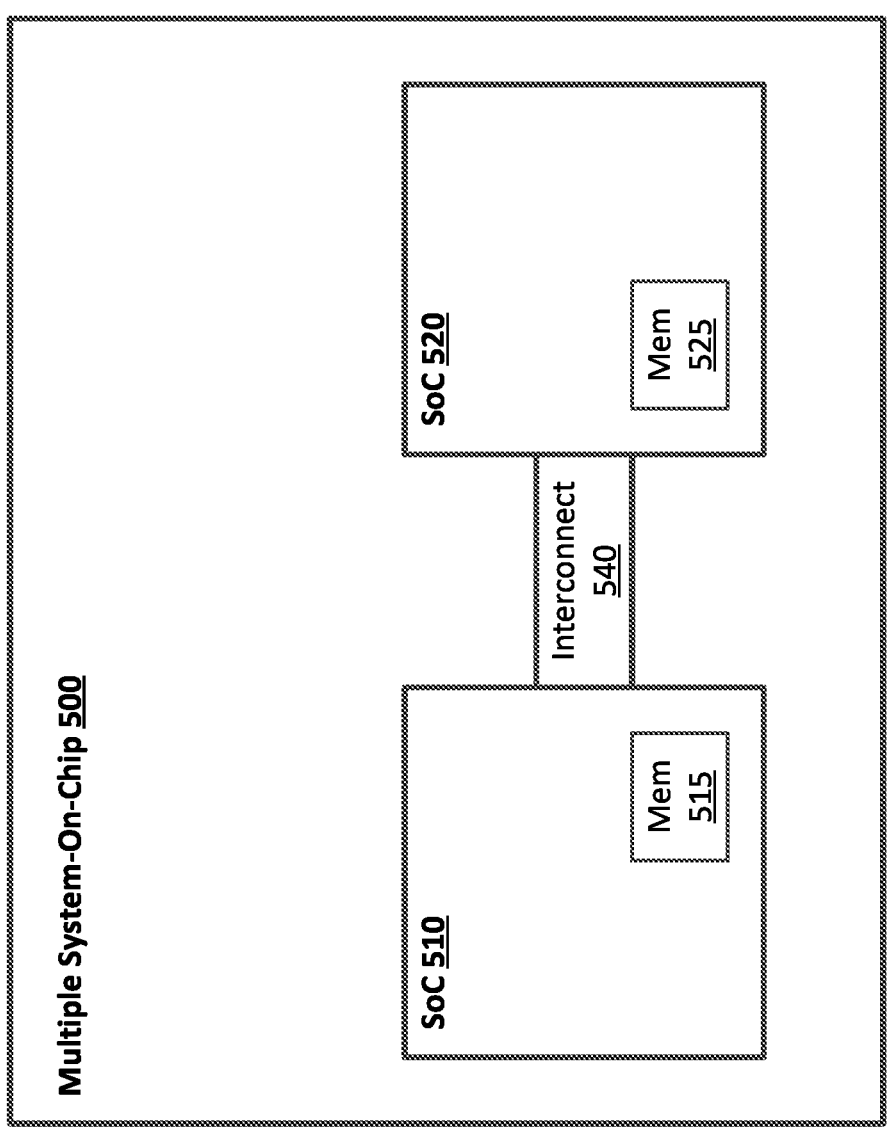
FIG. 5 is a block diagram depicting an example multiple system-on-chip (MSoC), in accordance with examples described herein.

FIG. 5 is a block diagram depicting an example computing system 500 implementing a multiple system-on-chip (MSoC), in accordance with examples described herein. In various examples, the computing system 500 can include a first SoC 510 having a first memory 515 and a second SoC 520 having a second memory 525 coupled by an interconnect 540 (e.g., an ASIL-D rated interconnect) that enables each of the first SoC 510 and second SoC 520 to read each other's memories 515, 525. During any given session, the first SoC 510 and the second SoC 520 may alternate roles, between a primary SoC and a backup SoC. As provided herein, the primary SoC can perform various autonomous driving tasks, such as perception, object detection and classification, grid occupancy determination, sensor data fusion and processing, motion prediction (e.g., of dynamic external entities), motion planning, and vehicle control tasks. The backup SoC can maintain a set of computational components (e.g., CPUs, ML accelerators, and/or memory chiplets) in a low power state, and continuously or periodically read the memory of the primary SoC.

For example, if the first SoC 510 is the primary SoC and the second SoC 520 is the backup SoC, then the first SoC 510 performs a set of autonomous driving tasks and publishes state information corresponding to these tasks in the first memory 515. The second SoC 520 reads the published state information in the first memory 515 to continuously check that the first SoC 510 is operating within nominal thresholds (e.g., temperature thresholds, bandwidth and/or memory thresholds, etc.), and that the first SoC 510 is performing the set of autonomous driving tasks properly. As such, the second SoC 520 performs health monitoring and error management tasks for the first SoC 510, and takes over control of the set of autonomous driving tasks when a triggering condition is met. As provided herein, the triggering condition can correspond to a fault, failure, or other error experienced by the first SoC 510 that may affect the performance of the set of tasks by the first SoC 510.

In various implementations, the second SoC 520 can publish state information corresponding to its computational components being maintained in a standby state (e.g., a low power state in which the second SoC 520 maintains readiness to take over the set of tasks from the first SoC 510). In such examples, the first SoC 510 can monitor the state information of the second SoC 520 by continuously or periodically reading the memory 525 of the second SoC 520 to also perform health check monitoring and error management on the second SoC 520. For example, if the first SoC 510 detects a fault, failure, or other error in the second SoC 520, the first SoC 510 can trigger the second SoC 520 to perform a system reset or reboot.

In certain examples, the first SoC 510 and the second SoC 520 can each include a functional safety (FuSa) component (e.g., a FuSa program 338 executed by one or more processors 340 of a central chiplet 300, as shown and described with respect to FIG. 3) that performs the health monitoring and error management tasks. The FuSa component can be maintained in a powered state for each SoC, whether the SoC operates in a primary or backup manner. As such, the backup SoC may maintain its other components in a low powered state, with its FuSa component being powered up and performing the heath monitoring and error management tasks described herein.

In various aspects, when the first SoC 510 operates as the primary SoC, the state information published in the first memory 515 can correspond to the set of tasks being performed by the first SoC 510. For example, the first SoC 510 can publish any information corresponding to the surrounding environment of the vehicle (e.g., any external entities identified by the first SoC 510, their locations, and predicted trajectories, detected objects, such as traffic signals, signage, lane markings, and crosswalk, and the like). The state information can further include the operating temperatures of the computational components of the first SoC 510, bandwidth usage and available memory of the chiplets of the first SoC 510, and/or any faults or errors, or information indicating faults or errors in these components.

In further aspects, when the second SoC 520 operates as the backup SoC, the state information published in the second memory 525 can correspond to the state of each computational component of the second SoC 520. In particular, these components may operate in a low power state in which the components are ready to take over the set of tasks being performed by the first SoC 510. The state information can include whether the components are operating within nominal temperatures and other nominal ranges (e.g., available bandwidth, power, memory, etc.).

As described throughout the present disclosure, the first SoC 510 and the second SoC 520 can switch between operating as the primary SoC and the backup SoC (e.g., each time the system 500 is rebooted). For example, in a computing session subsequent to a session in which the first SoC 510 operated as the primary SoC and the second SoC 520 operated as the backup SoC, the second SoC 520 can assume the role of the primary SoC and the first SoC 510 can assume the role of the backup SoC. It is contemplated that this process of switching roles between the two SoCs can provide substantially even wear of the hardware components of each SoC, which can prolong the lifespan of the computing system 500 as a whole.

According to embodiments, the first SoC 510 can be powered by a first power source and the second SoC 520 can be powered by a second power source that is independent or isolated from the first power source. For example, in an electric vehicle, the first power source can comprise the battery pack used for propelling the electric motors of the vehicle, and the second power source can comprise the auxiliary power source of the vehicle (e.g., a 12-volt battery). In other implementations, the first and second power sources can comprise other types of power sources, such as dedicated batteries for each SoC 510, 520 or other power sources that are electrically isolated or otherwise not dependent from each other.

It is contemplated that the MSoC arrangement of the computing system 500 can be provided to increase the safety integrity level (e.g., ASIL rating) of the computing system 500 and the overall autonomous driving system of the vehicle. As described herein, the autonomous driving system can include any number of dual SoC arrangements, each of which can perform a set of autonomous driving tasks. In doing so, the backup SoC dynamically monitors the health of the primary SoC in accordance with a set of functional safety operations, such that when a fault, failure, or other error is detected, the backup SoC can readily power up its components and take over the set of tasks from the primary SoC.

Functional Safety Accounting

Figure 6:
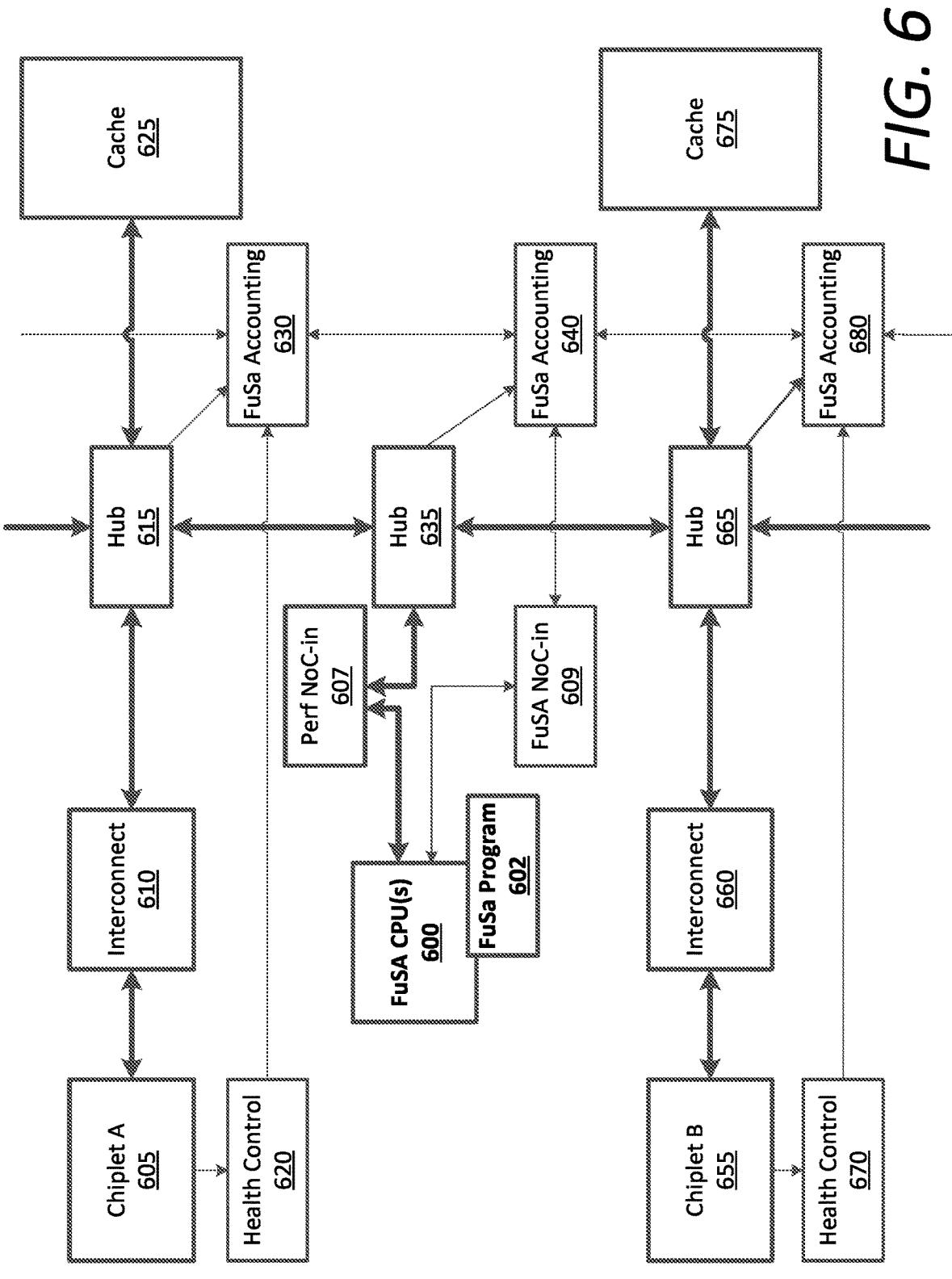
FIG. 6 is a block diagram depicting a performance network and a FuSa network for performing health monitoring and error correction, according to examples described herein.

FIG. 6 is a block diagram depicting a performance network and a FuSa network for performing health monitoring and error correction, according to examples described herein. In various examples, the FuSa CPU(s) 600 can be included on a central chiplet 300 of an SoC, or each central chiplet 300 of an MSoC 500 as described herein. Each FuSa CPU 600 can execute a FuSa program 602, which can correspond to the FuSa program 338 as shown and described with respect to FIG. 3. As described herein, execution of the FuSa program 602 can cause the FuSa CPU(s) 600 to perform the primary and backup SoC monitoring tasks described with respect to FIG. 5, and the execution of FuSa workloads in a FuSa pipeline 420 for comparison and verification of independent pipeline output described with respect to FIG. 4.

Furthermore, in the example shown in FIG. 6, multiple chiplets of the SoC can communicate with each other over a high-bandwidth performance network comprising respective sets of interconnects (e.g., interconnect 610 and interconnect 660) and network hubs (e.g., network hubs 615, 635, and 665). As described herein, the multiple chiplets can comprise the sensor data input chiplet 310, central chiplet 300, and workload processing chiplets 320 of FIG. 3, which are represented by chiplet A 605, chiplet B 655, and any number of additional chiplets (not shown) in FIG. 6. Still further, the cache memories 625, 675 shown in FIG. 6 may represent cache memories associated with multiple chiplets and/or the cache memory 315 of the central chiplet 300 as shown and described with respect to FIG. 3.

In various examples, raw sensor data, processed sensor data, and various communications between chiplet A 605, chiplet B 655, and the FuSa CPU(s) 600 can be transmitted over the high-bandwidth performance network comprising the interconnects 610, 660, network hubs 615, 635, 665, and caches 625, 675. For example, if chiplet A 605 comprises a sensor data input chiplet, then chiplet A 605 can obtain sensor data from the various sensors of the vehicle and transmit the sensor data to cache 625 via interconnect 610 and network hub 615. In this example, if chiplet B 655 comprises a workload processing chiplet, then chiplet B 655 can acquire the sensor data from cache 625 via network hubs 615, 635, 665 and interconnect 660 to execute respective inference workloads based on the sensor data.

In certain implementations, the FuSa CPU(s) 600, through execution of the FuSa program 602, can communicate with the high-bandwidth performance network via a performance network-on-chip (NoC) 607 coupled to a network hub 635. These communications can comprise, for example, acquiring output data from independent pipelines to perform the comparison and verification steps described herein. The communications over the high-bandwidth performance network can further comprise communications to access the shared memories 515, 525 of each SoC 510, 520 in a multiple SoC 500 that comprises a primary SoC and a backup SoC. In such examples, the FuSa CPUs 600 of each SoC 510, 520 access the shared memory 515, 525 of each other to determine whether any faults, failures, or other errors have occurred. As described herein, when the backup SoC detects a fault, failure, or error, the backup SoC takes over the primary SoC tasks (e.g., inference, scene understanding, vehicle control tasks, etc.).

In some aspects, the interconnects 610, 660 are used as a high-bandwidth data path used for general data purposes to the cache memories 625, 675, and health control modules 620, 670 and FuSa accounting hubs 630, 640, and 680 are used as a high-reliability data path to transmit functional safety and scheduler information to the shared memory of the SoC. NoCs and network interface units (NIUs) on chiplet A 605 and chiplet B 655 can be configured to generate error-correcting code (ECC) data on both the high-band-width and high-reliability data paths. Each corresponding NIU on each pairing die has the same ECC configuration, which generates and checks the ECC data to ensure end-to-end error correction coverage.

According to various embodiments, the FuSa CPU(s) 600 communicates via a FuSa network comprising the FuSa accounting hubs 630, 640, 680 and health control modules 620, 670 via a FuSa NoC 609. As provided herein, the FuSa network facilitates the communication monitoring and error correction code techniques. As shown in FIG. 6, a FuSa accounting hub 630, 640, 680 can monitor communications transmitted through each network hub 615, 635, 665 of the high-bandwidth network. Each of chiplet A 605 and chiplet B 655 can communicate with or include a health control module 620, 670 through which ECC data, workload start and end communications, and scheduling information can be transmitted.

For the FuSa network data paths, the NIUs can transmit the functional safety and scheduler information through the health control modules 620, 670 in two redundant transactions, with the second transaction ordering the bits in reverse (e.g., from bit 31 to 0 on a 32-bit bus) of the order of the first transaction. Furthermore, if errors are detected in the data transfers between chiplet A 605 and chiplet B 655 over the high-reliability FuSa network, the NIUs can reduce the transmission rate to improve reliability.

In some examples, certain processors of chiplet A 605, chiplet B 655, and/or the FuSa CPU(s) 600 can include a transient-resistant CPU core to run the scheduling program 342 of FIG. 3, which schedules workloads belonging to the reflex program 330, application program 335, thermal management program 337, and/or the FuSa program 602. The transient-resistant CPU cores are designed to resist and recover from transient faults caused by environmental factors such as cosmic radiation, power surges, and electromagnetic interference. These faults can cause the CPU to malfunction or produce incorrect results, potentially leading to system failures or security vulnerabilities. To address these issues, the transient-resistant CPU cores can include a range of hardware-based fault detection and recovery mechanisms, such as redundant execution units, error-correcting code (ECC) memory, and register duplication. These mechanisms can detect and correct errors in real-time, ensuring that the CPU continues to function correctly even in the presence of transient faults. Additionally, the transient-resistant CPU cores may include various software-based fault tolerance techniques, such as checkpointing and rollback, to further enhance system reliability and resilience.

In some aspects, the health control modules 620, 670 and FuSa accounting hubs 630, 640, 680 can detect and correct errors in real-time, ensuring that the CPUs continue to function correctly even in the presence of transient faults. For example, the workload processing chiplet A 540 and the central chiplet 520 perform an error correction check to verify that the processed data was sent and stored in the cache memories 625, 675 completely and without corruption. For example, for each processed data communication, the workload processing chiplets can generate an error correction code (ECC) using the processed data and transmit the ECC to the central chiplet. While the data itself is transmitted along a high-bandwidth performance network between chiplets, the ECC is sent along a high-reliability FuSa network via the FuSa accounting hubs 630, 640, 680. Upon receiving the processed data, the central chiplet can generate its own ECC using the processed data, and the FuSa CPU 600 can perform a functional safety call in the central chiplet mailbox to compare the two ECCs to ensure that they match, which verifies that the data was transmitted correctly.

It is contemplated that the communications over the high-bandwidth perform network and high-reliability FuSa network, as well as the ECC techniques described herein can provide additional redundancy and mitigative actions that can bolster the ASIL rating of individual SoC components and the autonomous drive system as a whole. As such, a safety authority may readily verify and certify the various methods and components described throughout the present disclosure such that an autonomous drive system implementing these methods and components can be deemed safe and reliable for use on public road networks.

Methodology

Figure 7:
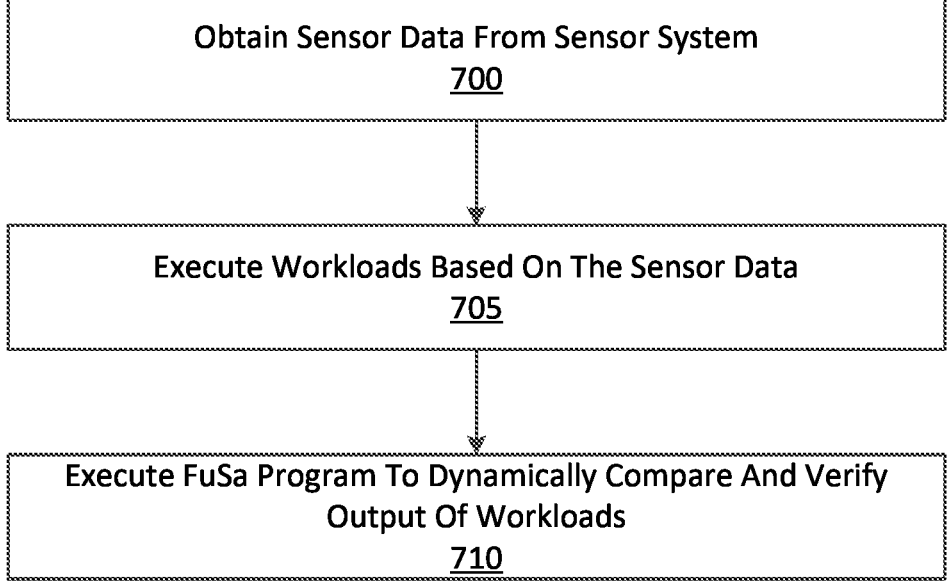
FIG. 7 is a flow chart describing a method of dynamically comparing and verifying workload outputs by a set of workload processing chiplets, according to various examples.
Figure 8:
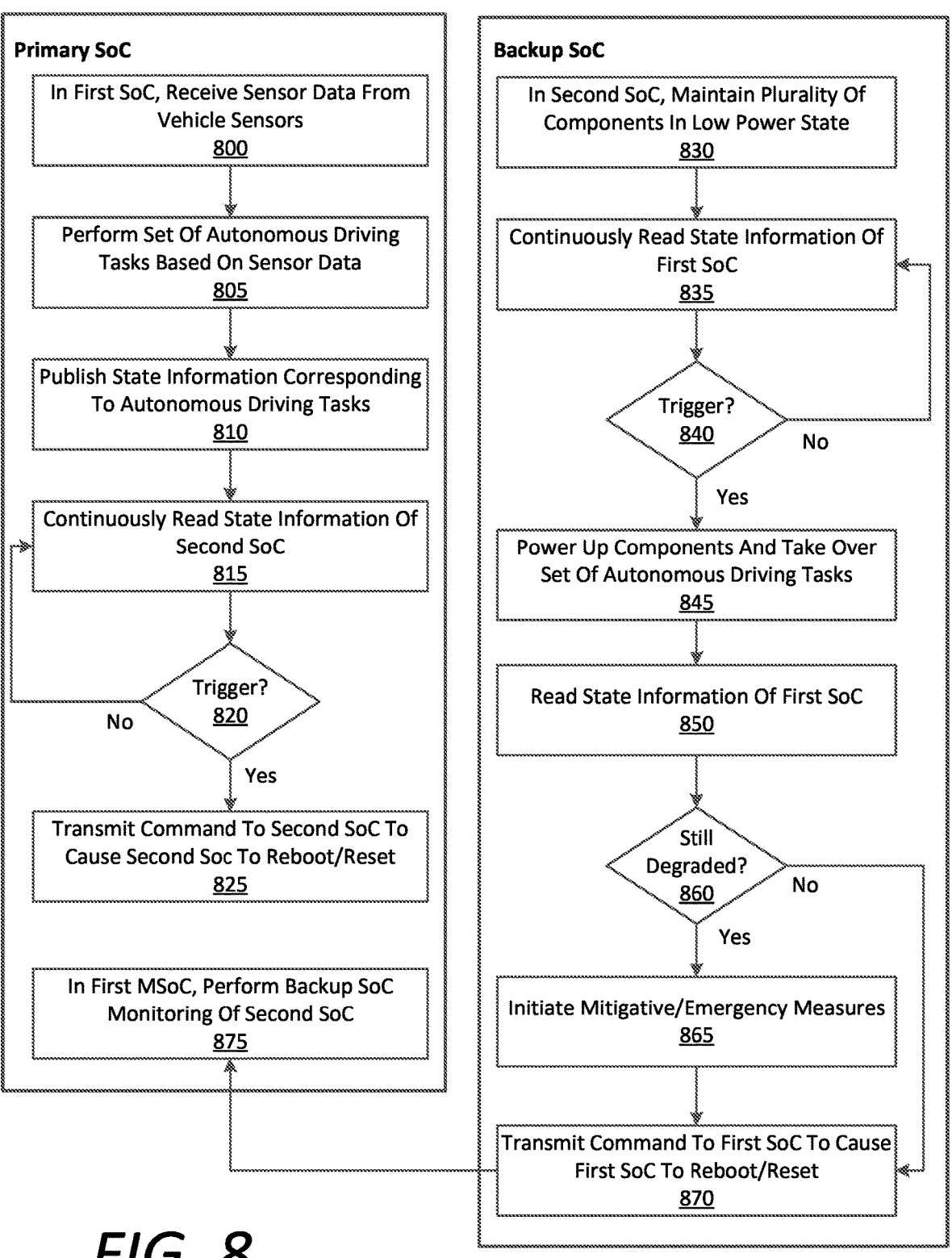
FIG. 8 is a flow chart describing a method of performing backup operations in a multiple system-on-chip (MSoC) arrangement, according to various examples.
Figure 9:
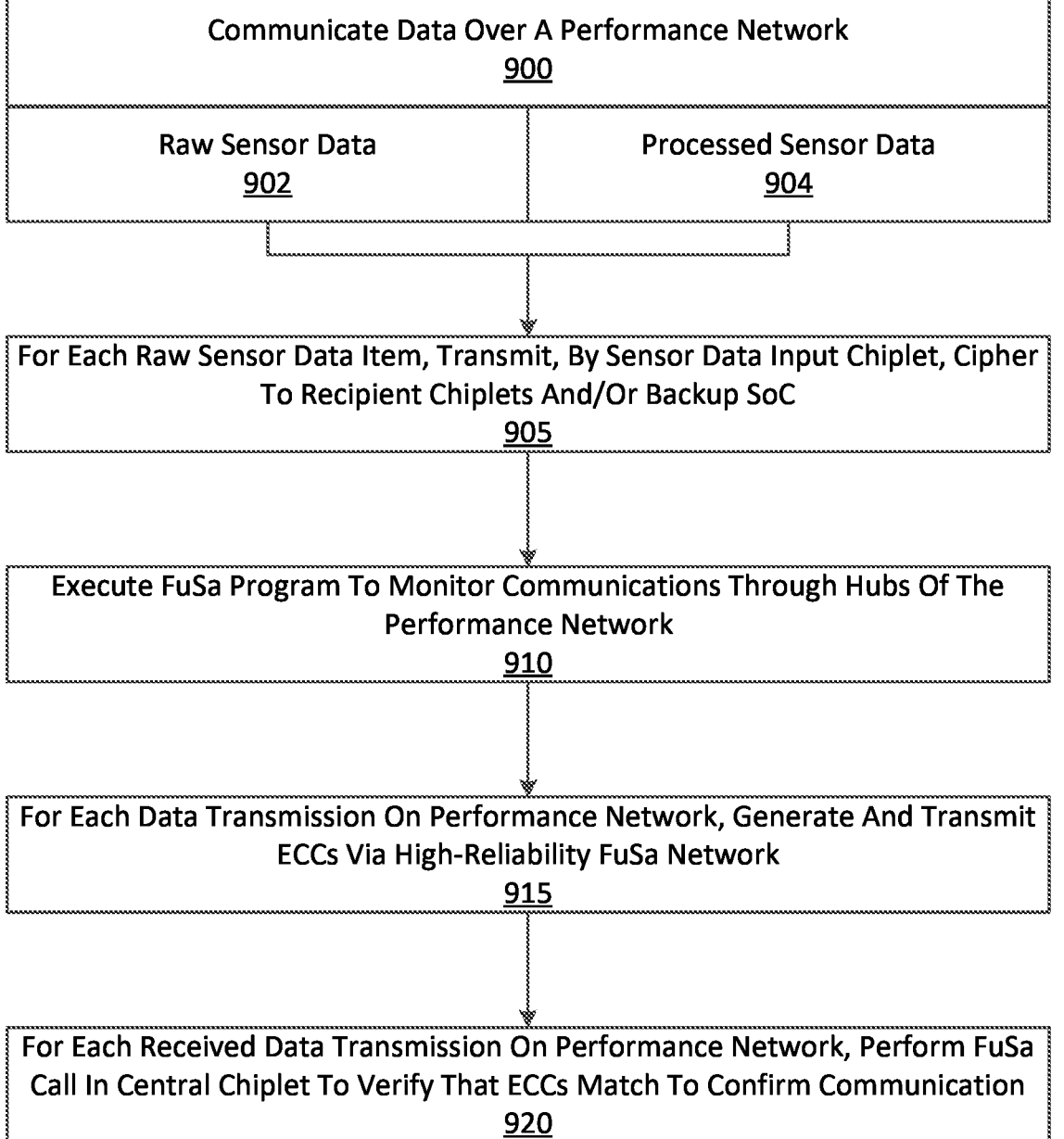
FIG. 9 is a flow chart describing a method of monitoring communications in a high-bandwidth performance network by a FuSa program, according to various examples described herein.

FIG. 7 through 9 are flow charts describing various methods of implementing functional safety techniques described above. In the below discussions of the methods of FIGS. 7 through 9, reference may be made to reference characters representing certain features described with respect to the diagrams of FIGS. 1 through 6. Furthermore, the steps described with respect to the flow charts of FIGS. 7 through 9 may be performed by the computing system 100, the workload processing chiplets 320 and central chiplet 300 of the SoC 200, and/or the MSoC 500 as shown and described with respect to FIGS. 1 through 6. Further still, certain steps described with respect to the flow charts of FIGS. 7 through 9 may be performed prior to, in conjunction with, or subsequent to any other step, and need not be performed in the respective sequences shown.

FIG. 7 is a flow chart describing a method of dynamically comparing and verifying workload outputs by a set of workload processing chiplets, according to various examples. Referring to FIG. 7, at block 700, a sensor data input chiplet 310 can obtain sensor data from a set of vehicle sensors 205. As described herein, the sensor data from the vehicle sensors 205 can comprise any combination of LIDAR data, image data, radar data, and/or other forms of sensor data (e.g., ultrasonic data, IR data, etc.).

At block 705, a set of workload processing chiplets (e.g., processing chiplets 320 and/or the central chiplet 300) can execute workloads based on the sensor data in a set of independent pipelines. In particular, the scheduling program 342 of the central chiplet 300 can schedule specified sets of workloads to be executed in a deterministic manner within independent pipelines. For example, the scheduling program 342 can impart dependency information in the workload entries such that they are not executed until the dependency information is resolved. This dependency information can comprise other workloads that need to be executed prior to execution of that particular workload. In further examples, the workload processing chiplets can execute the workloads in the set of independent pipelines deterministically using the reservation table 350 as an out-of-order buffer (e.g., by sequentially analyzing workload entries in a workload window 355 using an instruction pointer for multimedia content).

As provided herein, the workload processing chiplets can execute the workloads in the set of independent pipelines to perform a set of tasks for operating a vehicle. In various examples, the set of tasks can comprise a plurality of image stitching tasks, sensor fusion tasks, machine learning inference tasks, object detection tasks, object classification tasks, scene understanding tasks, motion prediction tasks, and the like. These tasks can comprise inference operations to process the surrounding environment of the vehicle such that an application program 335 can successfully operate the vehicle along a travel route. As such, the set of independent pipelines can provide output (e.g., an inferred sensor view of the surrounding environment) to the application program 335 for autonomously operating the vehicle.

At block 710, the central chiplet 300 can include a FuSa program 338 that dynamically compares and verifies output of a plurality of independent pipelines in a FuSa pipeline in a deterministic manner, as shown in the example FuSa pipeline 420 of FIG. 4. In particular, the FuSa program 338 can dynamically compare and verify output of workloads executed by the set of workload processing chiplets 320, the workloads being executed across the set of workload processing chiplets 320 based on the sensor data. Execution of the workloads in deterministic pipelines (e.g., via the reflex program 330) can result in generating an inferred sensor view of a surrounding environment of the vehicle, which can be provided to an application program 335 for autonomously operating the vehicle. It is contemplated that each independent deterministic pipeline corresponding to the reflex program 330 can be certified (e.g., for use on public roads by a safety authority). These pipelines can include all inference operations that correspond to perception, object detection and classification, occupancy grid determination, motion prediction and/or planning, and any other scene understanding task for autonomously operating the vehicle.

FIG. 8 is a flow chart describing a method of performing backup operations in a multiple system-on-chip (MSoC) arrangement, according to various examples. Referring to FIG. 8, at block 800, a first SoC 510 can receive sensor data from a set of vehicle sensors 205. At block 805, the first SoC 510 can perform a set of autonomous driving tasks based on the sensor data. For example, the first SoC 510 can include a set of chiplets, as shown in FIG. 2, that each perform one or more autonomous driving tasks that include one or more perception, inference, object detection and/or classification, right-of-way determination, occupancy grid determination, motion prediction, motion planning, and/or vehicle control tasks for the autonomous vehicle. In certain examples, the autonomous driving tasks can comprise sensor data perception and inference tasks for autonomously operating a vehicle along a travel route. At block 810, the first SoC 510 can further publish state information in a shared memory 515 of the first SoC 510.

At block 815, through execution of the FuSa program 338, the first SoC 510 can continuously read state information of the second SoC 520. For example, the state information of the second SoC 520 can indicate the operating parameters of the various computational components (e.g., chiplets) of the second SoC 520 in the low powered state, and can further indicate whether these components are operating within those parameters (e.g., whether the components are warmed up and ready to take over the set of autonomous driving tasks). At decision block 820, the first SoC 510 can dynamically determine whether a trigger has been detected in the state information of the second SoC 520. As provided herein, the trigger can correspond to any of the components of the second SoC 520 operating outside nominal parameters, or a fault, failure, or error experienced by the second SoC 520. If no trigger is detected, then the first SoC 510 can continue monitoring the state information of the second SoC 520. However, if at any time a trigger is detected, then at block 825, the first SoC 510 can, for example, transmit a command to the second SoC 520 to cause the second SoC 520 to perform a system reboot. As described herein, information communicated between SoC 510 and SoC 520 can be transmitted via a robust, ASIL-D rated interconnect (e.g., interconnect 540 shown in FIG. 5) using an error correction code (ECC), which provides redundancy algorithmically (e.g., through use of block codes, convolutional codes, and the like).

At block 830, the second SoC 520 can maintain a plurality of computational components in a low power state. As described above, these components can include any one or more of the chiplets as shown and described with respect to FIG. 2. At block 835, the second SoC 520, through execution of the FuSa program 338, can continuously read the state information as published by the first SoC 510. At decision block 840, the second SoC 520 can determine whether a trigger is detected in the state information. As provided herein, the trigger can correspond to the first SoC 510 experiencing a fault or a failure, where the fault or the failure can correspond to the first SoC 510 experiencing degraded performance, such as overheating, a power surge, or an error in the first SoC 510. If no trigger is detected, then the second SoC 520 can continue to monitor the state information of the first SoC 510. However, if a trigger is detected at any time, at block 845, the second SoC 520 can power up its computational components and take over the set of autonomous driving tasks from the first SoC 510, while the first SoC 510 powers down its components and assumes the role of backup SoC.

At block 850, based on the FuSa program 338, the second SoC 520 can continue to read the state information of the first SoC 510. At decision block 860, the second SoC 520 can determine whether the first SoC 510 is still degraded. If so, at block 865, the second SoC 520 can initiate a set of mitigative or emergency measures. In certain aspects, these measures can comprise reducing the speed of the vehicle, providing a notification to any passengers in the vehicle (e.g., to take over manual control of the vehicle), autonomously operating the vehicle to a safe location (e.g., pulling over the vehicle or driving to a home location), and/or autonomously operating the vehicle to a service center to resolve the degraded status of the first SoC 510.

In some examples, at block 870, the second SoC 520 may further transmit a command to cause the first SoC 510 to perform a system reboot. At block 855, the first SoC 510 may then perform the backup SoC tasks, such as maintaining a subset of its components in a low power state and dynamically monitoring state information as published by the primary SoC 520. If at any time, the primary and secondary SoCs are unable to communicate (e.g., one of the SoCs is unable to boot up), the autonomous drive system of the vehicle will not engage. It is contemplated that this arrangement provides necessary redundancy for an increased ASIL rating of the autonomous drive system of the vehicle (e.g., contributes to an ASIL-D rating).

In various examples, each time the MSoC arrangement reboots, the first SoC 510 and the second SoC 520 can switch between primary and backup roles to maintain substantially even wear on the MSoC components, such as the various chiplets of each SoC. Furthermore, the SoCs can be electrically coupled via one or more eFuses that protect the SoCs from each other (e.g., from voltage or current surges). Along these lines, the first SoC 510 and the second SoC 520 can be powered by distinct power sources, such as the battery pack used for propulsion of the vehicle, and the auxiliary power source of the vehicle used for powering the auxiliary components (e.g., ECU, lights, radio, etc.).

As provided herein, the state information monitoring and error management functions performed by the first and second SoCs 510, 520 can be performed by functional safety components of each SoC (e.g., the FuSa program 338 and FuSa processor). As further provided herein, for the backup SoC, the FuSa components remain powered up to perform their functional safety tasks while the remaining components are maintained in the low power state, and ready to assume the primary SoC tasks. It is contemplated that the first SoC 510 and the second SoC 520 being arranged to dynamically read state information and take over the set of tasks of the primary SoC provides redundancy to facilitate an automotive safety integrity level rating for the autonomous drive computing system (e.g., achieve an ASIL-D rating).

FIG. 9 is a flow chart describing a method of monitoring communications in a high-bandwidth performance network by a FuSa program 602, according to various examples described herein. As provided herein, at block 900, the sensor data input chiplet 310, the central chiplet 300, and the one or more workload processing chiplets 320 can communicate data over a performance network comprising a plurality of network hubs. For example, the sensor data input chiplet 310 can communicate raw sensor data, at block 902, to a cache memory 315, where the sensor data may be accessed by the central chiplet 300 and/or workload processing chiplets 320 to execute their respective workloads. In further examples, at block 904, the workload processing chiplets 320 and/or central chiplet 300 can transmit and receive processed sensor data (e.g., to and from the cache memory 315).

To provide increased security, certain encryption methods may be used in the communications between chiplets and/or between the primary and backup SoC. In certain examples, each sensor data item, such as images, point cloud maps, radar pulses, etc. can be transmitted using an encryption technique (e.g., a cipher using public-private key encryption) in which the recipient chiplet (e.g., central chiplet 300 and/or workload processing chiplet 320) decrypts the transmission to access the sensor data item. In certain aspects, the cipher can comprise a coded algorithm associated with a public key of the sensor data component at which the sensor data item originated. Each sensor data item from each sensor data component (e.g., image sensors, LIDAR sensors, radar sensors, etc.) is generated sequentially. In accordance with examples described herein, any subsequent data item from any sensor data component cannot be accessed by recipient chiplets without decryption and verification of the previous sensor data item from the respective sensor data components.

For multiple SoC arrangements, the sensor data input chiplet 310 or central chiplets 300 of the primary SoC can generate a cipher for each sensor data item (e.g., individual images, point cloud maps, radar data pulses, etc.) that identifies the data source of the sensor data item (e.g., individual image sensors, LIDAR sensors, radar sensors, etc.). The generated cipher can be transmitted to the backup SoC to facilitate immediate takeover of the primary SoC's functions.

At block 905, for each received raw sensor data item, the sensor data input chiplet 310 or central chiplet 300 (e.g., via the FuSa program 338) can transmit the cipher associated with the raw sensor data item to the recipient chiplets(s) and/or the backup SoC for decryption and verification to associate the sensor data item with the sensor data source. In certain examples, the cipher can be transmitted over the performance network via the network hubs 615, 635, 665, the high-reliability network via the health control modules 620, 670 and FuSa accounting hubs 630, 640, 680, or both.

As provided herein, decryption of the cipher enables the backup SoC to readily take over if any faults, failures, or errors occur in the primary SoC. In certain examples, when such faults, failures, or errors occur (e.g., a power surge, overheating, etc.), the backup SoC can utilize a corresponding private key to decode the cipher and verify the data source of each of the sensor data items. In various aspects, each of the primary and backup SoCs has direct access to the sensor components of the vehicle. Accordingly, when the primary SoC experiences an issue, the backup SoC can provide a verification indicator to the sensor data components indicating that the previously sent sensor data items were decrypted accordingly, thereby enabling access to additional sensor data items from the individual sensor data components. Thereafter, the back SoC can assume the role of primary SoC, as described above.

In various implementations, at block 910, the FuSa program 602 is executed (e.g., by one or more dedicated FuSa CPUs 600) to monitor communications through the plurality of network hubs 615, 635, 665 of the performance network between the sensor data input chiplet 310, the central chiplet 300, and the one or more workload processing chiplets 320. In such implementations, a set of FuSa accounting hubs can be connected to the network hubs of the performance network to receive communication data (e.g., a 32-bit register that indicates whether any errors are present in a particular communication) for each communication. The FuSa program 602 can receive this information from the FuSa accounting hubs 615, 635, 665 via a FuSa NoC 609 that enables the FuSa program 602 to communicate with each chiplet of the SoC over a high-reliability FuSa network. Furthermore, the chiplets can communicate workload start and end indicators over health control modules 620, 670 and the FuSa accounting hubs 630, 640, 680, which can, for example, cause dependency information in the reservation table 350 to be updated accordingly.

As provided herein, the central chiplet 300 can include a dedicated FuSa CPU 600 executing the FuSa program 602 to communicate over the performance network via the performance NoC 607, and communicate over the high-reliability FuSa network via the FuSa NoC 609. For each data transmission on the performance network, at block 915, the chiplets can generate and transmit ECCs over the high-reliability FuSa network (e.g., via the health control modules 620, 670 and FuSa accounting hubs 630, 640, 680). For example, when a workload processing chiplet 320 communicates with the shared memory 360 of the central chiplet 300, the workload processing chiplet 320 can also generate and transmit a first ECC based on the communicated data along the FuSa network. Upon receiving the data, the central chiplet 300 can generate a second ECC based on the received data.

At block 920, for each received data transmission, the central chiplet 300 can perform a FuSa call to verify that the first ECC and the second ECC match to ensure that the data was transmitted correctly and confirm the communication. As provided herein, the ECC techniques can be performed for each communication to the central chiplet 300. In further examples, the ECC techniques may also be performed for communications between workload processing chiplets 320, between the central chiplet 300 and workload processing chiplets 320, and/or between the sensor data input chiplet 310 and central chiplet 300.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A computing system, comprising:
   a sensor data input chiplet to obtain sensor data from a sensor system;
   a set of workload processing chiplets; and
   a first central chiplet comprising a shared memory including a functional safety (FuSa) program that causes one or more processors of the first central chiplet to:
     dynamically compare and verify output of workloads executed by the set of workload processing chiplets, the workloads being executed across the set of workload processing chiplets based on the sensor data;
   a first system-on-chip (SoC) that includes the first central chiplet; and
   a second SoC that includes a second central chiplet, the first SoC and the second SoC being communicatively coupled by an interconnect;
   wherein the FuSa program is further included in the second central chiplet of the second SoC, the FuSa program included in the second central chiplet of the second SoC causes one or more processors of the second SoC to:
     monitor the shared memory of the first central chiplet of the first SoC to dynamically determine whether the first SoC is functioning within nominal operating parameters.

2. The computing system of claim 1, wherein the sensor data input chiplet, the first central chiplet, and the set of workload processing chiplets communicate over a performance network comprising a plurality of network hubs, and wherein the FuSa program monitors communications through the plurality of network hubs between the sensor data input chiplet, the first central chiplet, and the one or more workload processing chiplets.

3. The computing system of claim 2, wherein the FuSa program monitors communications through the plurality of network hubs using a set of FuSa accounting hubs that communicate over a high-reliability FuSa network.

4. The computing system of claim 3, wherein the first central chiplet comprises a dedicated FuSa CPU executing the FuSa program to (i) communicate over the performance network via a performance network-on-chip (NoC), and (ii) communicate over the high-reliability FuSa network via a FuSa NoC.

5. The computing system of claim 4, wherein the set of workload processing chiplets transmit (i) processed data to a cache memory of the first central chiplet over the performance network, and (ii) a first error correction code (ECC) along the high-reliability FuSa network to the first central chiplet based on the processed data.

6. The computing system of claim 5, wherein upon receiving the processed data, the first central chiplet generates a second ECC using the processed data, and wherein the FuSa CPU performs a functional safety call in the first central chiplet to verify that the first ECC and the second ECC match to ensure that the processed data was transmitted correctly.

7. The computing system of claim 1, wherein the computing system is included on a vehicle, and wherein the workloads comprise inference tasks based on the sensor data for autonomously operating the vehicle.

8. The computing system of claim 1, wherein the workloads are executed by the set of workload processing chiplets in independent pipelines, and wherein the FuSa program dynamically compares and verifies output of the independent pipelines by executing a set of FuSa workloads in a FuSa pipeline.

9. The computing system of claim 1, wherein the FuSa program in the second central chiplet of the second SoC further causes the one or more processors of the second SoC to:
   in response to determining that the first SoC is not functioning within nominal operating parameters, cause a second set of workload processing chiplets of the second SoC to take over execution of the workloads.

10. The computing system of claim 1, wherein determining that the first SoC is not operating within nominal operating parameters corresponds to one or more of the first SoC overheating, a power surge, or an error in the first SoC.

11. The computing system of claim 9, wherein for each respective sensor data item generated by each respective sensor data component of the sensor system, the first SoC generates a cipher associated with the respective sensor data component at which the respective sensor data item originates, and transmits the cipher to the second SoC.

12. The computing system of claim 11, wherein, upon determining that the first SoC is not functioning within the nominal operating parameters, the second SoC decrypts the cipher to verify the respective sensor data item to take over execution of the workloads.

13. A non-transitory computer readable medium storing instructions that, when executed by one or more processors of a computing system, cause the computing system to:
   obtain, by a sensor data input chiplet of the computing system, sensor data from a sensor system;
   on a first central chiplet of a first system-on-chip (SoC) of the computing system, execute a functional safety program (FuSa) to dynamically compare and verify output of workloads executed by a set of workload processing chiplets, the workloads being executed across the set of workload processing chiplets based on the sensor data; and
   on a second central chiplet of a second SoC of the computing system on which the FuSa program is included, monitor a shared memory of the first central chiplet of the first SoC to dynamically determine whether the first SoC is functioning within nominal operating parameters.

14. The non-transitory computer readable medium of claim 13, wherein the sensor data input chiplet, the first central chiplet, and the set of workload processing chiplets communicate over a performance network comprising a plurality of network hubs, and wherein the FuSa program monitors communications through the plurality of network hubs between the sensor data input chiplet, the first central chiplet, and the one or more workload processing chiplets.

15. The non-transitory computer readable medium of claim 14, wherein the FuSa program monitors communications through the plurality of network hubs using a set of FuSa accounting hubs that communicate over a high-reliability FuSa network.

16. The non-transitory computer readable medium of claim 15, wherein the first central chiplet comprises a dedicated FuSa CPU executing the FuSa program to (i) communicate over the performance network via a performance network-on-chip (NoC), and (ii) communicate over the high-reliability FuSa network via a FuSa NoC.

17. The non-transitory computer readable medium of claim 16, wherein the set of workload processing chiplets transmit (i) processed data to a cache memory of the first central chiplet over the performance network, and (ii) a first error correction code (ECC) along the high-reliability FuSa network to the first central chiplet based on the processed data.

18. A computer-implemented method of implementing functional safety on a computing system, the method being performed by one or more processors and comprising:

obtaining, by a sensor data input chiplet of the computing system, sensor data from a sensor system;

on a first central chiplet of a first system-on-chip (SoC) of the computing system, executing a functional safety (FuSa) program to dynamically compare and verify output of workloads executed by a set of workload processing chiplets, the workloads being executed across the set of workload processing chiplets based on the sensor data; and on a second central chiplet of a second SoC of the computing system on which the FuSa program is included, monitoring a shared memory of the first central chiplet of the first SoC to dynamically determine whether the first SoC is functioning within nominal operating parameters.

\*  \*  \*  \*  \*